(12) United States Patent
Onoda et al.

(10) Patent No.: US 9,415,808 B2
(45) Date of Patent: Aug. 16, 2016

(54) VEHICLE FRONT SECTION STRUCTURE

(71) Applicant: TOYOTA JIDOSHA KABUSHIKI KAISHA, Toyota-shi (JP)

(72) Inventors: Masahiro Onoda, Toyota (JP); Shinpei Matsumoto, Nagoya (JP); Takuma Ono, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/679,230

(22) Filed: Apr. 6, 2015

(65) Prior Publication Data

US 2015/0321700 A1 Nov. 12, 2015

(30) Foreign Application Priority Data

May 8, 2014 (JP) .................. 2014-097017

(51) Int. Cl.
*B62D 25/08* (2006.01)
*B62D 21/15* (2006.01)
*B62D 27/02* (2006.01)

(52) U.S. Cl.
CPC ............ *B62D 25/082* (2013.01); *B62D 21/152* (2013.01); *B62D 27/02* (2013.01)

(58) Field of Classification Search
CPC ..... B62D 21/152; B62D 21/155; B62D 27/02
USPC ................ 296/187.09, 187.1, 193, 7, 203.01, 296/203.02
See application file for complete search history.

(56) References Cited

U.S. PATENT DOCUMENTS

| 3,860,258 | A  | * | 1/1975  | Feustel ................... B60R 19/34 180/232 |
| 9,079,619 | B2 | * | 7/2015  | Gupta .................. B62D 21/152 |
| 2010/0327626 | A1 | * | 12/2010 | Baumann ............... B62D 21/15 296/187.09 |
| 2013/0081897 | A1 |   | 4/2013  | Dandekar et al. |
| 2013/0341969 | A1 | * | 12/2013 | Fujii .................. B62D 25/2036 296/193.07 |

FOREIGN PATENT DOCUMENTS

| JP | 2008-290674   | 12/2008 |
| JP | 2009-226971 A | 10/2009 |

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle front section structure comprising a side rail extending along a vehicle front-rear direction at a vehicle width direction outside of a vehicle front section, the side rail including a bent portion at the vehicle rear side of a front tire, and the bent portion bending toward the vehicle width direction outside on progression from the vehicle front toward the vehicle rear; and a projection projecting out from the bent portion toward the vehicle width direction outside, and having an angled face angled toward the vehicle width direction outside on progression from the vehicle front toward the vehicle rear at a face of the projection facing the front tire.

8 Claims, 5 Drawing Sheets

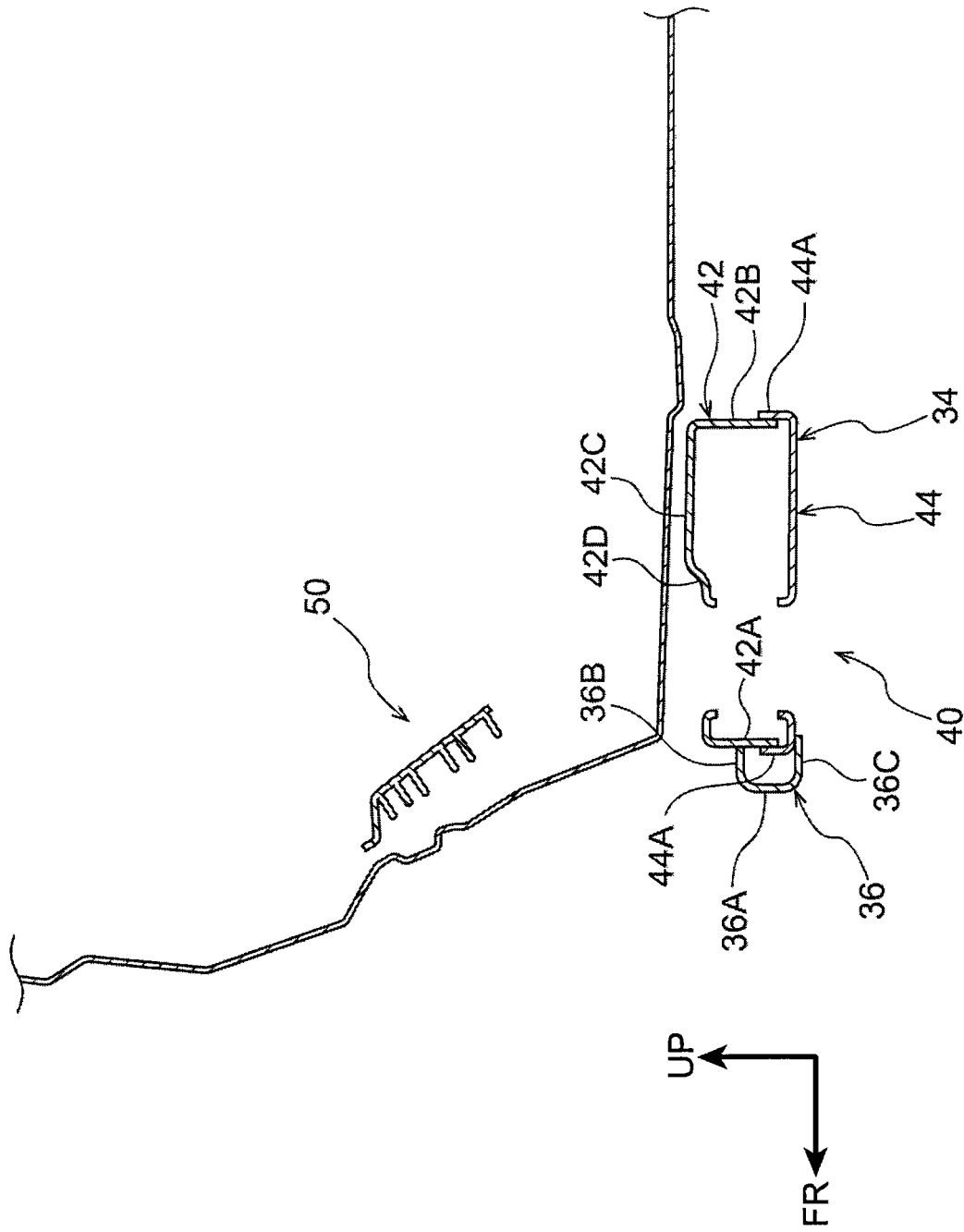

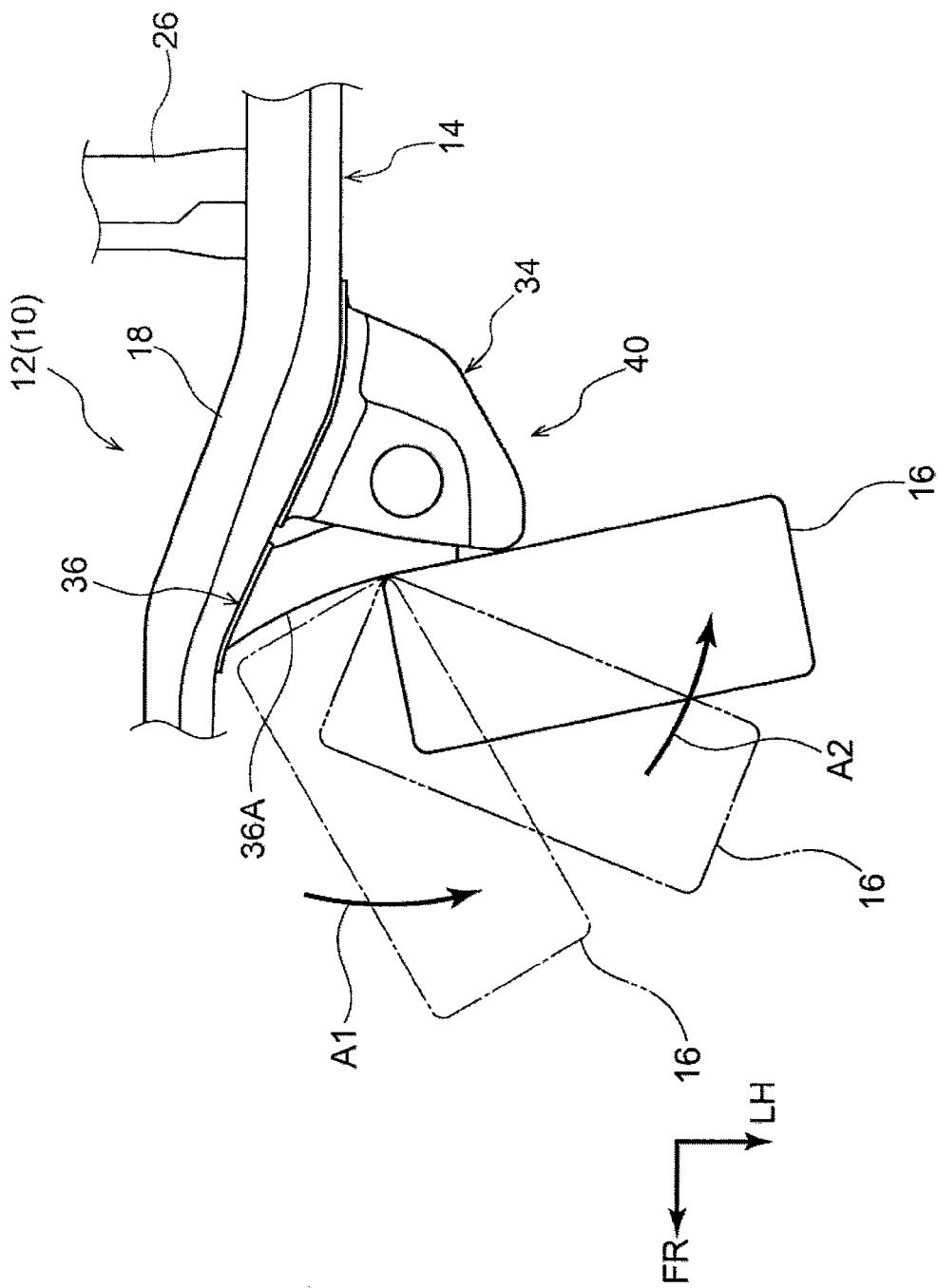

VEHICLE FRONT SECTION STRUCTURE

CROSS-REFERENCE TO RELATED APPLICATION

This application is claims priority under 35 USC 119 from Japanese Patent Application, No. 2014-97017 filed May 8, 2014, the disclosure of which is incorporated by reference herein.

BACKGROUND OF THE INVENTION

1. Technical Field

The present invention relates to a vehicle front section structure.

2. Related Art

In a known vehicle front section structure provided with a side rail running along the vehicle front-rear direction at the vehicle width direction outside of a vehicle front section, the vehicle front section structure includes a bent portion provided at the side rail so as to bend toward the vehicle width direction outside on progression from the vehicle front toward the vehicle rear, and a cab mount bracket provided projecting out from the bent portion toward the vehicle width direction outside. As such a vehicle front section structure, Japanese Patent Application Laid-Open (JP-A) No. 2008-290674 describes a structure in which planar reinforcement is joined to the bent portion, and the cab mount bracket is coupled to the side rail through the reinforcement.

SUMMARY

In the event of a head-on collision at the vehicle width direction outside of the side rail (in the event of a small overlap collision), sometimes a front tire is shunted backwards and contacts the bent portion. A vehicle front section structure capable of suppressing collision load from being input from the front tire to the side rail is accordingly desired.

In consideration of the above circumstances, the present invention is to obtain a vehicle front section structure capable of suppressing collision load from being input from the front tire to the side rail in the event of a head-on collision such as a small overlap collision.

A vehicle front section structure of a first aspect of the present invention includes: a side rail that extends along a vehicle front-rear direction at a vehicle width direction outside of a vehicle front section, the side rail includes a bent portion at the vehicle rear side of a front tire, and the bent portion bends toward the vehicle width direction outside on progression from the vehicle front toward the vehicle rear; and a projection that projects out from the bent portion toward the vehicle width direction outside, and that includes an angled face angled toward the vehicle width direction outside on progression from the vehicle front toward the vehicle rear at a face of the projection facing the front tire.

In the vehicle front section structure of the first aspect, the side rail includes the bent portion bending toward the vehicle width direction outside on progression from the vehicle front toward the vehicle rear. The bent portion is provided at the vehicle rear side of the front tire, and the projection projects out from the bent portion toward the vehicle width direction outside. Note that the face of the projection facing the front tire configures the angled face angled toward the vehicle width direction outside on progression from the vehicle front toward the vehicle rear. When the front tire contacts the projection in the event of a head-on collision such as a small overlap collision, the front tire can be diverted away from the side rail while pivoting about the angled face such that the front side of the tire opens out toward the vehicle width direction outside.

A vehicle front section structure of a second aspect of the present invention is the vehicle front section structure of the first aspect, wherein the projection includes a cab mount bracket projecting out from the bent portion toward the vehicle width direction outside, and an angled member that is provided at a vehicle front side of the cab mount bracket and that is supported from the vehicle rear side by the cab mount bracket, wherein the angled face is formed at the angled member.

In the vehicle front section structure of the second aspect, the angled member is provided at the vehicle front side of the cab mount bracket, enabling a gap between the cab mount bracket and the side rail to be closed off. The cab mount bracket can moreover bear collision load input to the angled member when the front tire contacts the angled member.

A vehicle front section structure of a third aspect of the present invention is the vehicle front section structure of the second aspect, wherein the angled member is joined to a vehicle width direction outside face of the side rail, and a height dimension of the angled member in the vehicle up-down direction at a joint portion of the angled member to the side rail is substantially the same as a height dimension of the side rail.

In the vehicle front section structure of the third aspect, the joint strength between the angled member and the side rail can be increased in comparison to when the height dimension of the joint portion of the angled member is smaller than the height dimension of the side rail.

A vehicle front section structure of a fourth aspect of the present invention is the vehicle front section structure of any one of the first aspect to the third aspect, wherein the angled face is formed longer in the vehicle width direction than a tire width of the front tire.

In the vehicle front section structure of the fourth aspect, the front tire can be made to contact the angled face reliably in the event of a head-on collision such as a small overlap collision.

A vehicle front section structure of a fifth aspect of the present invention is the vehicle front section structure of any one of the second aspect to the fourth aspect, wherein a height dimension of the angled member in the vehicle up-down direction gradually decreases on progression from the vehicle width direction inside toward the vehicle width direction outside.

In the vehicle front section structure of the fifth aspect, an increase in weight of the angled member can be suppressed while maintaining the joint strength between the angled member and the side rail.

A vehicle front section structure of a sixth aspect of the present invention is the vehicle front section structure of any one of the second aspect to the fifth aspect, wherein a vehicle width direction outside end portion of the angled member is joined to the cab mount bracket.

In the vehicle front section structure of the sixth aspect, the angled member is supported from the vehicle rear side by the cab mount bracket. This thereby enables the cab mount bracket to bear collision load input to the angled member when the front tire contacts the angled member.

As described above, the vehicle front section structure of the first aspect exhibits the excellent advantageous effect of enabling input of collision load from the front tire to the side rail to be suppressed in the event of a head-on collision such as a small overlap collision.

The vehicle front section structure of the second aspect enables the front tire to be suppressed from entering between the cab mount bracket and the side rail. The second aspect moreover exhibits the excellent advantageous effect of enabling deformation of the angled member toward the vehicle rear to be suppressed.

The vehicle front section structure of the third aspect exhibits the excellent advantageous effects of raising the joint strength of the angled member, and enabling deformation of the angled member toward the vehicle rear to be suppressed.

The vehicle front section structure of the fourth aspect enables the front tire to be diverted stably away from the side rail.

The vehicle front section structure of the fifth aspect enables an increase in the weight of the angled member to be suppressed.

The vehicle front section structure of the sixth aspect enables the front tire to be suppressed from entering between the cab mount bracket and the side rail. Deformation of the angled member toward the vehicle rear can also be suppressed.

BRIEF DESCRIPTION OF THE DRAWINGS

Embodiments of the present invention will be described in detail based on the following figures, wherein:

FIG. 4 is a cross-section taken along line 4-4 in FIG. 3; and

FIG. 5 is an enlarged plan view of relevant portions, illustrating movement of a front tire in a small overlap collision.

DETAILED DESCRIPTION OF THE INVENTION

Figure 1:
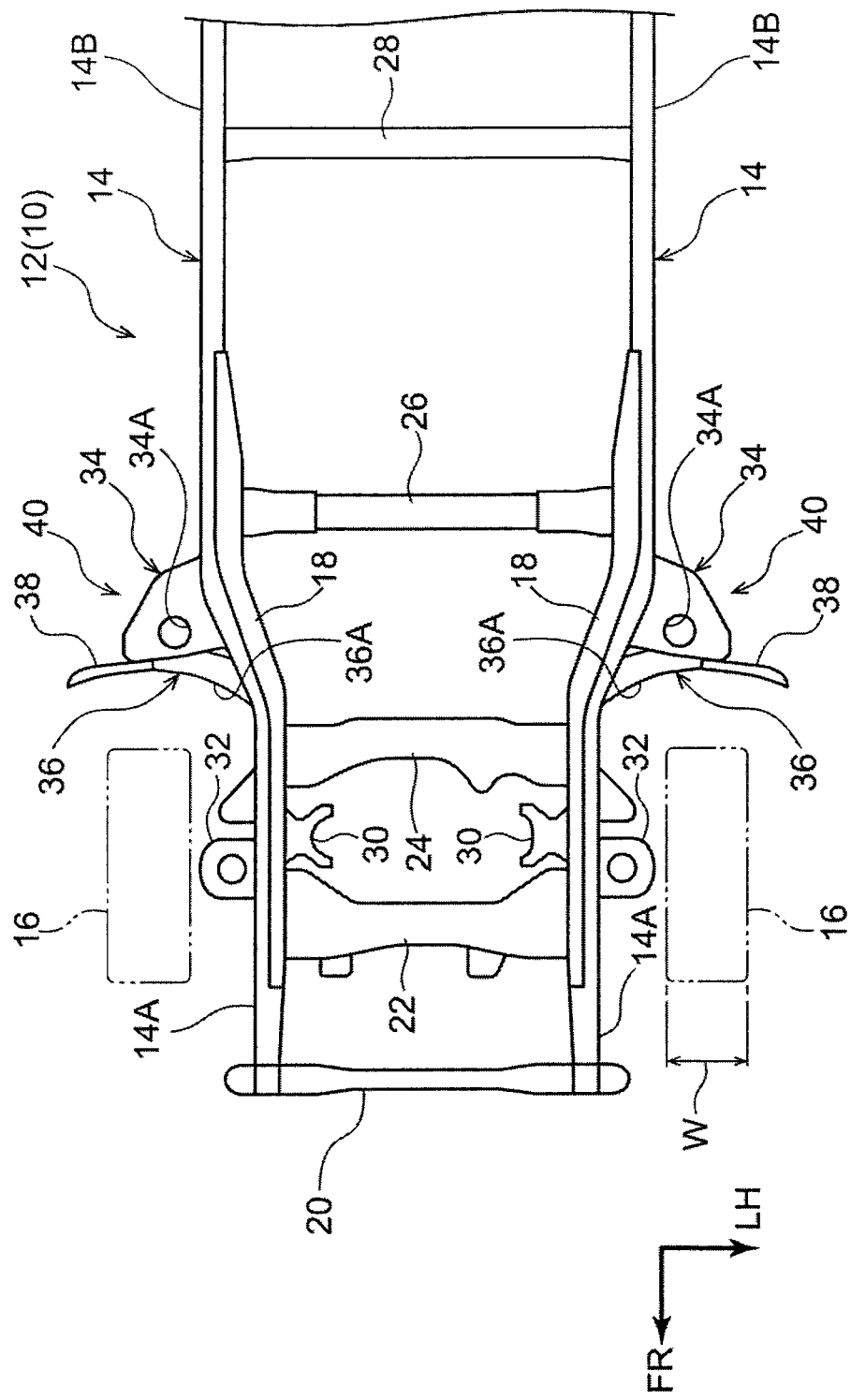
FIG. 1 is a plan view illustrating relevant portions of a vehicle applied with a vehicle front section structure according to an exemplary embodiment.

Explanation follows regarding a vehicle front section structure according to the present invention, with reference to the drawings. In the drawings, the arrow FR indicates the vehicle front side, the arrow UP indicates the vehicle upper side, and the arrow LH indicates the left hand side in the vehicle width direction, as appropriate. In the following explanation, unless specifically mentioned, reference to the front and rear, up and down, and left and right directions refers to front and rear in the vehicle front-rear direction, up and down in the vehicle up-down direction, and left and right in the vehicle left-right direction (vehicle width direction).

Vehicle Front Section Structure Configuration

FIG. 1 illustrates a vehicle front section 12 of a vehicle 10 applied with a vehicle front section structure according to an exemplary embodiment. As illustrated in FIG. 1, a pair of left and right side rails 14 is respectively provided on both sides in the vehicle width direction of the vehicle 10.

The side rails 14 extend along the vehicle front-rear direction at the vehicle width direction outsides of the vehicle front section 12. Front tires 16 are disposed at the vehicle width direction outsides of front portion 14A of the side rails 14. Vicinity of the front portion 14A of the side rails 14 are set with shorter dimensions in the vehicle width direction than vicinity of vehicle front-rear direction central portion 14B of the side rails 14, in consideration of interference with the front tires 16.

Bent portions 18 bending toward the vehicle width direction outside on progression of the side rails 14 from the vehicle front toward the vehicle rear are provided between the front portion 14A and central portion 14B in the vehicle front-rear direction of each side rail 14. The bent portions 18 are provided at the vehicle rear side of the front tires 16, and the bent portions 18 connect together the front portions 14A and the central portions 14B of the respective side rails 14. The front portions 14A of the side rails 14 are disposed at the upper side of the vehicle than the central portions 14B, in consideration of the placement of components such as a suspension unit. The bent portions 18 therefore slope toward the lower side on progression from the front portions 14A of the side rails 14 toward the vehicle rear side.

Bumper reinforcement 20 spans between front ends of the pair of side rails 14 in the vehicle width direction. Energy absorbing members such as crash boxes may be installed between the front ends of the side rails 14 and the bumper reinforcement 20. In the present exemplary embodiment, the bumper reinforcement 20 has a length longer than the separation between the front portions 14A of the side rails 14, and shorter than the separation between the central portions 14B; however there is no limitation thereto, and the bumper reinforcement 20 may be formed longer in the vehicle width direction than the separation between the central portions 14B.

Plural cross members 22, 24, 26, 28 span between the pair of side rails 14 in the vehicle width direction at the vehicle rear side of the bumper reinforcement 20. The vehicle front section 12 of the present exemplary embodiment is thereby configured with a ladder shaped frame. The cross members 22, 24 are provided on the front portion 14A side of the side rails 14, and the cross members 26, 28 are provided on the central portion 14B side of the side rails 14. FIG. 1 illustrates the front portions 14A and part of the central portions 14B of the side rail 14; however plural cross members also span between the pair of side rails 14 further to the rear side than is illustrated in FIG. 1.

Metal engine mount brackets 30 are provided projecting out from the front portions 14A of the side rails 14 toward the vehicle width direction inside of the side rails 14 between the cross member 22 and the cross member 24. An engine mount, not illustrated in the drawings, is attached to the engine mount brackets 30, and configuration is made such that an engine unit can be coupled to the side rails 14 through the engine mount and the engine mount brackets 30.

Metal suspension mount brackets 32 are provided slightly further to the vehicle front side than the engine mount brackets 30, projecting out from the front portions 14A of the side rails 14 toward the vehicle width direction outsides of the side rails 14 between the cross member 22 and the cross member 24. Suspension mounts, not illustrated in the drawings, are attached to the suspension mount brackets 32, and configuration is made such that suspension units can be coupled to the side rails 14 through the suspension mounts and the suspension mount brackets 32.

Projections 40 are provided at the bent portions 18 at the vehicle rear side of the suspension mount brackets 32. Each of the projections 40 projects out from the corresponding bent portion 18 toward the vehicle width direction outside, and is configured including a cab mount bracket 34 and an angled member 36. As viewed from the front side of the vehicle, the projections 40 are in a state projecting out further to the vehicle width direction outsides than other portions of the side rails.

Figure 2:
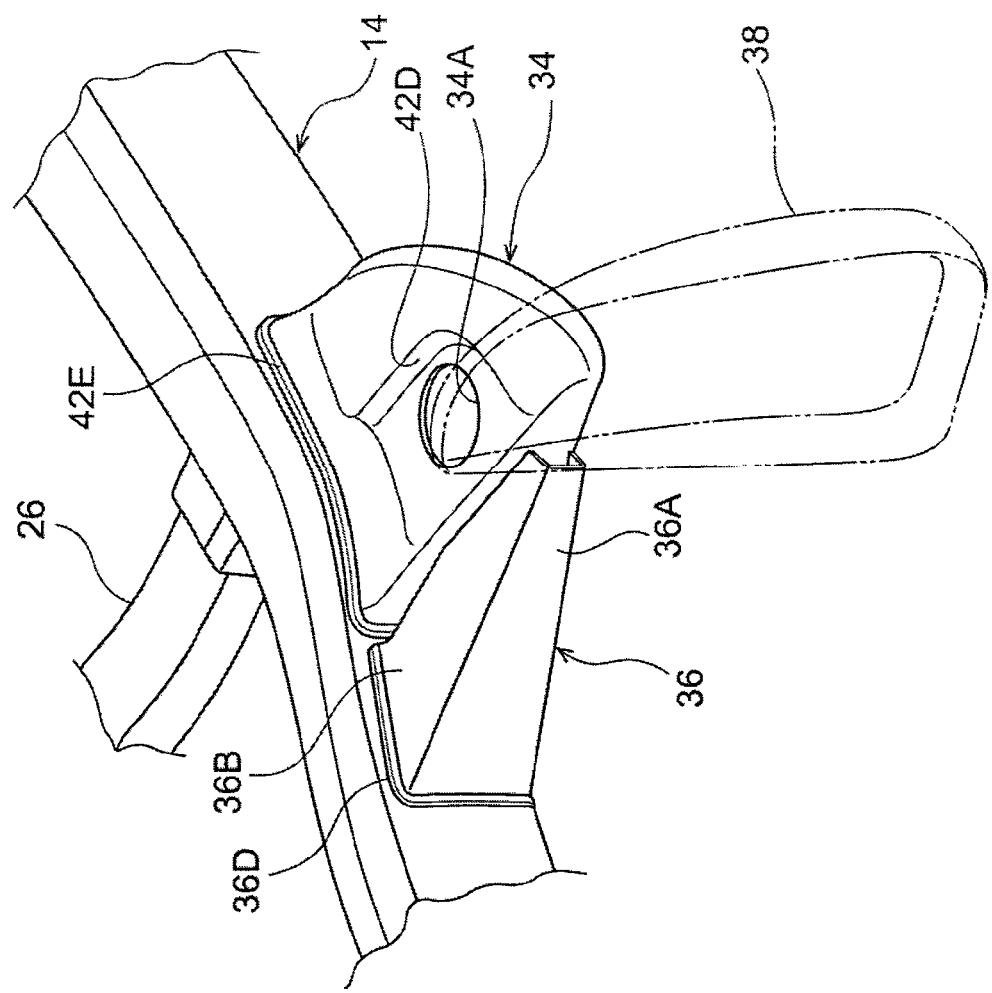
FIG. 2 is an enlarged perspective view illustrating relevant portions of a cab mount bracket and an angled member according to an exemplary embodiment.

As illustrated in FIG. 2, the cab mount brackets 34 configuring the projections 40 become gradually thinner on progression from the vehicle width direction inside toward the outside, and each of the cab mount brackets 34 is formed with an attachment hole 34A for attaching a cab mount, not illustrated in the drawings. Configuration is made such that a cab (body), not illustrated in the drawings, can be coupled to the side rails 14 through the cab mounts and the cab mount brackets 34.

As illustrated in FIG. 4, the cab mount brackets 34 are each configured including an upper bracket 42 and a lower bracket 44. The cross-section profile of the upper bracket 42 along the vehicle front-rear direction is formed substantially in an inverted U-shape, and is open toward the lower side. The upper bracket 42 is configured including a front wall 42A positioned at a vehicle front-rear direction front portion, a rear wall 42B positioned at a vehicle front-rear direction rear portion, and an upper wall 42C positioned at an upper portion and connecting between the front wall 42A and the rear wall 42B. The upper wall 42C is formed with a step 42D such that a rear portion of the upper wall 42C is higher than a front portion of the upper wall 42C. As illustrated in FIG. 2, a flange 42E juts out toward the outside from a vehicle width direction inside end of the upper bracket 42. The flange 42E abuts the side rail 14, and is joined thereto by welding or the like.

Figure 3:
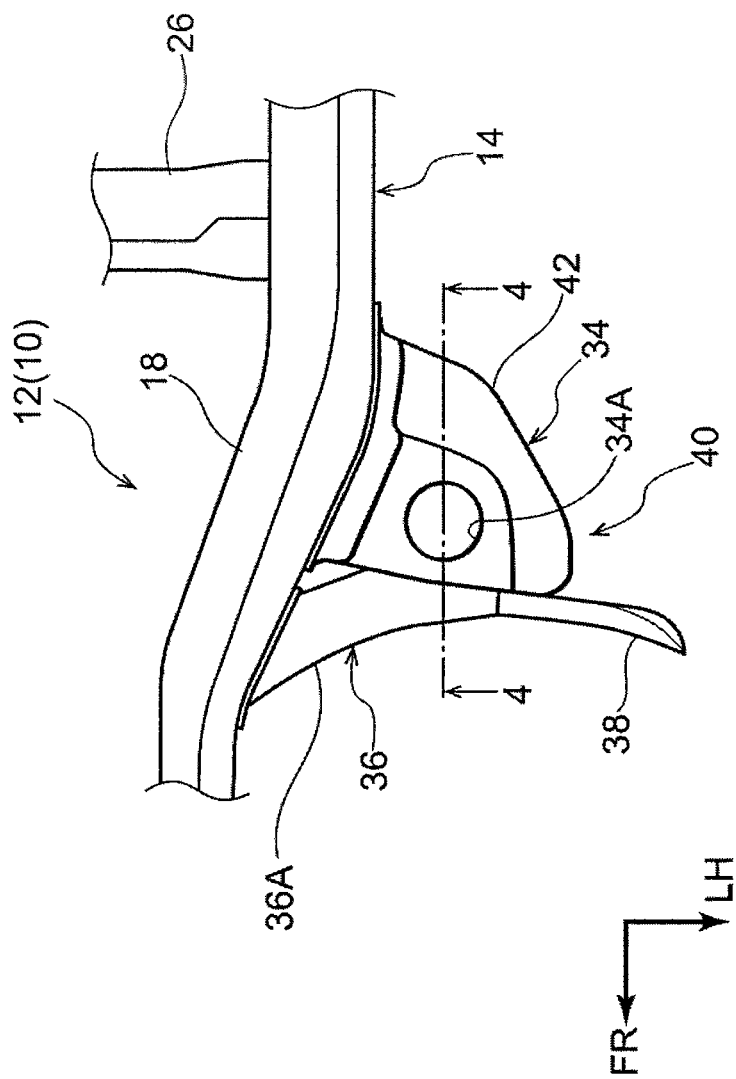
FIG. 3 is an enlarged plan view illustrating relevant portions of a cab mount bracket and an angled member according to an exemplary embodiment.

As illustrated in FIG. 3, the upper bracket 42 is formed so as to become wider toward the side rail 14 side, and is tapered on progression toward a leading end side positioned at the vehicle width direction outside. This thereby enables an increase in weight of the upper bracket 42 to be suppressed while maintaining joint strength to the side rail 14.

As illustrated in FIG. 4, the lower bracket 44 is configured in a plate shape, and an edge portion 44A is provided standing upright around an outer edge of the lower bracket 44. The edge portion 44A of the lower bracket 44 is disposed so as to cover a lower end of the upper bracket 42 from the outside, and the edge portion 44A is joined to the upper bracket 42 by welding or the like to configure the cab mount bracket 34. Note that the reference numeral 50 in FIG. 4 indicates a footrest provided in the footwell of the driving seat.

As illustrated in FIG. 2 and FIG. 3, the angled members 36 configuring the projections 40 are provided at the vehicle front side of the cab mount brackets 34. Each angled member 36 projects out from a front end portion of the corresponding bent portion 18 toward the vehicle width direction outside, and a vehicle width direction outside leading end portion of the angled member 36 is joined to the cab mount bracket 34.

As illustrated in FIG. 4, the cross-section profile of the angled member 36 along the vehicle front-rear direction is formed substantially in a U-shape, and is open toward the vehicle rear side. The angled member 36 is configured including a front wall 36A positioned at a vehicle front-rear direction front portion, an upper wall 36B extending from an upper end of the front wall 36A toward the vehicle rear, and a lower wall 36C extending from a lower end of the front wall 36A toward the vehicle rear.

At a vehicle width direction outside end portion of the angled member 36, a rear end portion of the upper wall 36B abuts the front wall 42A of the upper bracket 42 configuring the cab mount bracket 34, and is joined thereto by welding or the like. The lower wall 36C extends further to the vehicle rear than the upper wall 36B to overlap with a lower face of the lower bracket 44 configuring the cab mount bracket 34, and is joined thereto by welding or the like. The angled member 36 is thus supported from the vehicle rear side by the cab mount bracket 34 due to the configuration described above.

As illustrated in FIG. 2, a flange 36D juts out toward the outside at a vehicle width direction inside end of the angled member 36. The flange 36D abuts the side rail 14, and is joined thereto by welding or the like. Note that in the present exemplary embodiment, the vehicle width direction outside end portion of the angled member 36 is joined to the cab mount bracket 34; however there is no limitation thereto, and joining is not necessary as long as the angled member 36 is supported by the cab mount bracket 34 from the vehicle rear.

Similarly to the cab mount bracket 34, the angled member 36 is configured with height dimension in the vehicle up-down direction that gradually decreases on progression from the vehicle width direction inside toward the vehicle width direction outside. Namely, the angled member 36 is thinner on the vehicle width direction outside. In the present exemplary embodiment, the height dimension in the vehicle up-down direction at the vehicle width direction inside end of the angled member 36, namely the portion joined to the side rail 14, is set with the same height dimension as the side rail 14, and the height dimension gradually decreases on progression toward the vehicle width direction outside.

The "same height dimension as the side rail 14" referred to here is not limited to configurations in which the front wall 36A of the angled member 36 has exactly the same height dimension as a vehicle width direction outside face of the side rail 14, and encompasses a broad range of configurations in which the height dimension of the angled member 36 is smaller than the height dimension of the side rail 14, within a range in which there is no significant decrease in the joint strength between the angled member 36 and the side rail 14. In the structure of the present exemplary embodiment formed with the flange 36D, the dimension of the flange 36D is included in the height dimension of the angled member 36.

As illustrated in FIG. 1, the front wall 36A of the angled member 36 faces the front tire 16, and configures an angled face that is angled toward the vehicle width direction outside on progression from the vehicle front toward the vehicle rear. The length of the front wall (angled face) 36A along the vehicle width direction is formed longer than a tire width W of the front tire 16 in the vehicle width direction.

A mudguard 38 is provided at the vehicle width direction outside of the angled member 36. As illustrated in FIG. 2, the mudguard 38 is formed in a substantially rectangular plate shape with length direction along the vehicle up-down direction, and is disposed with the plate thickness direction running substantially in the vehicle front-rear direction. Note that a vehicle width direction inside edge portion of the mudguard 38 is joined to a vehicle width direction outside leading end portion of the cab mount bracket 34 by welding or the like. The mudguard 38 enables mud, water, and the like flicked up by the front tire 16 to be suppressed from hitting a vehicle body panel.

In the present exemplary embodiment, the mudguard 38 is provided at the vehicle width direction outside of the angled member 36, and so the leading end of the angled member 36 only extends as far as the vehicle width direction inside of the leading end of the cab mount bracket 34; however there is no limitation thereto. Namely, the angled member 36 may extend as far as the leading end of the cab mount bracket 34 in a vehicle not provided with the mudguard 38, or in a configuration in which the mudguard 38 is disposed further to the vehicle front side than the angled member 36, in a range where the mudguard 38 does not interfere with operation of the front tire 16.

In the present exemplary embodiment, the vehicle width direction inside end portion of the angled member 36 is not joined to the cab mount bracket 34, and a gap is formed between the angled member 36 and the cab mount bracket 34; however there is no limitation thereto. The angled member 36 may be formed with a shape that closes off the gap, as long as it does not get in the way of other peripheral components.

In the present exemplary embodiment, the angled member 36 is formed with a substantially U-shaped cross-section profile so as to suppress an increase in weight; however there is no limitation thereto, and, for example, a rear wall connecting between the upper wall 36B and the lower wall 36C may be provided to configure a closed cross-section profile in the angled member 36. Moreover, a reinforcement member may be provided inside the angled member 36. The cab mount bracket 34 and the angled member 36 may also be integrally formed to one another. Namely, the cab mount bracket 34 may be formed such that a face of the cab mount bracket 34 that faces the front tires 16 configures an angled face angled toward the vehicle width direction outside on progression from the vehicle front toward the vehicle rear.

Vehicle Front Section Structure Operation and Advantageous Effects

Next, explanation follows regarding operation and advantageous effects of the vehicle front section structure according to the present exemplary embodiment. As illustrated in FIG. 1, the side rails 14 are formed with the bent portions 18, and each of the bent portions 18 is provided with the projection 40 including the cab mount bracket 34 and the angled member 36, and projecting out toward the vehicle width direction outside. As viewed from the vehicle front side of the vehicle 10, the projections 40 are in a state projecting out from the vehicle front section 12 further toward the vehicle width direction outside than other portions of the side rails 14.

When collision load is input to the vehicle 10 in the event of a head-on collision such as a small overlap collision, as illustrated in FIG. 5, sometimes the front tire 16 is shunted backwards and contacts the projection 40. When this occurs, the angled member 36 configuring the projection 40 closes off the gap between the cab mount bracket 34 and the side rail 14, namely a space at a corner portion where a front end portion of the cab mount bracket 34 contacts the side rail 14. Accordingly, in the event of a small overlap collision, the front tire 16 can be suppressed from entering the gap between the side rail 14 and the cab mount bracket 34.

The front wall (angled face) 36A is provided facing the front tire 16 at the front portion of the angled member 36 configuring the projection 40. The front tire 16 that has contacted the front wall 36A can accordingly be diverted away from the side rail 14 while pivoting about the front wall 36A in the sequence illustrated by the arrows A1 and A2 in FIG. 5, such that the front side of the tire opens out toward the vehicle width direction outside. This thereby enables the front tire 16 to escape to the vehicle width direction outside, thereby enabling a reduction in the collision load input from the front tire 16 to the side rail 14. The space in the footwell of the driving seat in which components such as the footrest 50 are installed can accordingly be secured as a result (see FIG. 4). The front tire 16 rotates about the front wall 36A, thereby enabling collision load from the front tire 16 to the side rail 14 to be suppressed being transmitted concentrated in the same direction.

In the present exemplary embodiment, the vehicle width direction outside end portion of the angled member 36 is joined to the cab mount bracket 34, and the angled member 36 is supported from the vehicle rear side by the cab mount bracket 34. This thereby enables the cab mount bracket 34 to bear the collision load input to the angled member 36 when the front tire 16 contacts the angled member 36. The angled member 36 can accordingly be suppressed from deforming so as to bend toward the vehicle rear as a result.

As illustrated in FIG. 2, the angled member 36 of the present exemplary embodiment is formed with a gradually decreasing height dimension on progression from the vehicle width direction inside toward the vehicle width direction outside, and the portion of the angled member 36 joined to the side rail 14 is configured with the same height dimension as the side rail 14. This thereby enables an increase in weight to be suppressed while raising the joint strength between the angled member 36 and the side rail 14.

In the present exemplary embodiment, the length of the front wall (angled face) 36A of the angled member 36 along the vehicle width direction is formed longer than the tire width W of the front tire 16 in the vehicle width direction. This thereby enables the front tire 16 to contact the front wall 36A reliably when the front tire 16 has been shunted backwards. This thereby enables the front tire 16 to be suppressed from contacting the cab mount bracket 34, and enables the front tire 16 to be diverted stably away from the side rail 14.

Explanation has been given above regarding an exemplary embodiment of the present invention, however there is no limitation of the present invention to such an exemplary embodiment, and obviously various configurations may be implemented within a range not departing from the spirit of the present invention. For example, the present exemplary embodiment is provided with the projections 40 on both the left and right sides, but there is no limitation thereto, and, for example, a projection 40 may be provided only on the vehicle width direction left hand side, and a different structure configured on the vehicle width direction right hand side.

What is claimed is:

1. A vehicle front section structure comprising:
    a side rail extending along a vehicle front-rear direction at a vehicle width direction outside of a vehicle front section, the side rail including a bent portion at a vehicle rear side of a front tire, and the bent portion bending toward the vehicle width direction outside on progression from a vehicle front toward a vehicle rear; and
    a projection projecting out from the bent portion toward the vehicle width direction outside, and having an angled face angled toward the vehicle width direction outside on progression from the vehicle front toward the vehicle rear at a face of the projection facing the front tire,
    wherein the projection comprises an angled member and a cross-section profile of the angled member along the vehicle front-rear direction is open toward the vehicle rear side.

2. The vehicle front section structure of claim 1,
    wherein the projection further comprises a cab mount bracket projecting out from the bent portion toward the vehicle width direction outside,
    wherein the angled member is provided at a vehicle front side of the cab mount bracket and is supported from the vehicle rear side by the cab mount bracket, and
    wherein the angled face is formed at the angled member.

3. The vehicle front section structure of claim 2, wherein:
    the angled member is joined to a vehicle width direction outside face of the side rail; and
    a height dimension of the angled member in a vehicle up-down direction at a joint portion of the angled member to the side rail is substantially the same as a height dimension of the side rail.

4. The vehicle front section structure of claim 1, wherein the angled face is formed longer in the vehicle width direction than a tire width of the front tire.

5. The vehicle front section structure of claim 2, wherein a height dimension of the angled member in the vehicle up-down direction gradually decreases on progression from the vehicle width direction inside toward the vehicle width direction outside.

6. The vehicle front section structure of claim 2, wherein a vehicle width direction outside end portion of the angled member is joined to the cab mount bracket.

7. The vehicle front section structure of claim 1, wherein the angled member includes a front wall positioned at a vehicle front-rear direction front portion, an upper wall extending from an upper end of the front wall toward the vehicle rear, and a lower wall extending from a lower end of the front wall toward the vehicle rear, and the lower wall extends farther to the vehicle rear than the upper wall.

8. The vehicle front section structure of claim 7, wherein the lower wall is joined to a lower face of a cab mount bracket.

* * * * *